US006142286A

United States Patent [19]

Ulrich et al.

[11] Patent Number: 6,142,286

[45] Date of Patent: Nov. 7, 2000

[54] FLOOR COVERING FOR CONVEYING EQUIPMENT FOR PERSONS

[75] Inventors: Robert Ulrich, Bruckneudorf; Thomas Illedits, Neufeld, both of Austria

[73] Assignee: Inventio AG, Hergiswil NW, Switzerland

[21] Appl. No.: 09/097,529

[22] Filed: Jun. 10, 1998

[30] Foreign Application Priority Data

Jun. 20, 1997 [EP] European Pat. Off. .............. 97810392

[51] Int. Cl.[7] .......... B65G 15/00

[52] U.S. Cl. .......... 198/325

[58] Field of Search .......... 49/33, 463–466, 49/489.1; 16/366, 370; 198/323, 324, 325

[56] References Cited

U.S. PATENT DOCUMENTS

| | | | |
|---|---|---|---|
| 2,158,257 | 5/1939 | Sheehe | 16/371 |
| 3,513,780 | 5/1970 | Jenkins | 198/323 |
| 4,126,218 | 11/1978 | El Taher et al. | 198/325 |
| 4,565,276 | 1/1986 | Dengs et al. | 198/321 |
| 4,599,825 | 7/1986 | Sixsmith | 49/466 |
| 5,189,836 | 3/1993 | Alder et al. | 49/33 |
| 5,255,771 | 10/1993 | Nurnberg et al. | 198/323 |
| 5,372,231 | 12/1994 | Volkening et al. | 198/325 |
| 5,440,843 | 8/1995 | Langenhorst | 49/463 |

FOREIGN PATENT DOCUMENTS

| | | |
|---|---|---|
| 661229 | 7/1995 | European Pat. Off. . |
| 4336037 | 4/1995 | Germany . |
| 2244464 | 12/1991 | United Kingdom . |

OTHER PUBLICATIONS

Patent Abstracts of Japan, Pub.No. 04140298 Appln. No. 02218673 pub. May 14, 1992.

*Primary Examiner*—Daniel P. Stodola
*Assistant Examiner*—Curtis A. Cohen
*Attorney, Agent, or Firm*—Schweitzer Cornman Gross & Bondell LLP

[57] ABSTRACT

A floor cover for use in conjunction with conveying equipment for persons located at an end of an escalator, moving walkway or the like, has one or more cover elements which can be walked on and which flushly close off, relative to the surrounding flooring, the opening of an under-floor space in which operating equipment is typically located. The cover elements can be lifted and laterally displaced to expose the opening for access to the operating equipment. The cover elements are separably joined together at joint locations. A resilient profile member is located at each joint to prevent the generation of noises and to provide a tight seal between the cover elements against penetrating dirt. The cover can be raised, laterally displaced and rotated away from the opening by means of a multi-part hinge. The turned-up cover elements can, with a support device, be retained in a raised position to form an entry barrier for the exposed opening.

17 Claims, 3 Drawing Sheets

FLOOR COVERING FOR CONVEYING EQUIPMENT FOR PERSONS

The present invention relates to a floor cover for use in association with personnel conveying equipment, such as escalators and moving walkways.

BACKGROUND OF THE INVENTION

Floor-mounted covers, are used, for example, at the upper or lower ends of an escalator or at both ends of a moving walkway, to flushly close off, relative to the surrounding flooring which may be walked on, the opening or entranceway of an under-floor space in which controls and mechanisms for the conveying equipment are located. Means are provided by which the opening can be exposed for access to the operating equipment therein.

The demands on such a floor cover are diverse in nature. The floor cover must, with a reserve of safety, withstand the static and dynamic loads during operation of the conveying equipment. It must be embedded into and lie flushly with the surrounding floor surface with the smallest joint, and it must be able to be removed safely and as easily as possible for the purpose of access to the operating equipment. Further, the floor cover should not, during stepping on and walking over, produce any mechanical noises due to poor seating and/or horizontal displacement of the cover elements.

EP 0 661 229 discloses an angle frame which is connected to constructional parts of conveying equipment for persons and which serves as a seat for a floor cover. The angle frame is adjustable vertically and horizontally by means of screws and nuts to provide a flush and joint-free transition to the surrounding flooring. For damping of footstep noises during walking on of the floor cover, the seating surface of the angle frame is covered by a resilient profile member, wherein the resilient profile member is positively mechanically connected at its underside with a horizontal limb of the angle frame.

Such a one-piece floor cover shown can, due to its size, be difficult to remove and reinsert. Further, one-piece floor covers are often very heavy and thus may exceed prescribed weight limits for manual handling.

The object of the present invention is to create a floor cover which does not exhibit the aforesaid disadvantages and which brings, with little effort, great advantages for simplified and safe handling and largely precludes faulty operation.

The invention is distinguished inter alia by the fact that the floor cover consists of several separable elements insulated in terms of sound relative to one another. The floor cover can be manipulated between the closed and open orientations. By use of a inserted resilient profile member as an intermediate layer between the separable elements, the creation of noises when the floor cover is walked on is avoided. The resilient profile member may be non-detachably mounted in a notch in a cover element, has approximately the shape of a Greek capital letter omega, and can damp vertical and horizontal shocks. It additionally serves as a seal against penetrating dirt.

A multi-part hinge may be fastened to a longitudinal side of a cover element between the cover element and a frame to permit the cover to pivot open. The hinge may include three shifting rotational axles, which enable the cover elements to be lifted up, laterally displaced, separated and turned.

The cover elements may be formed as extruded hollow profile members, wherein two or more interfitting profile members form a non-separable double or multiple profile member.

The underside of one of the cover elements may have a strut, by means of which the raised cover elements can be held in the raised position to simultaneously form a barrier for the opening exposed by the open cover elements.

BRIEF DESCRIPTION OF THE DRAWINGS

The invention is more closely explained in the following by reference to an embodiment and is illustrated in the drawings, in which.

DETAILED DESCRIPTION OF THE INVENTION

Figure 1:
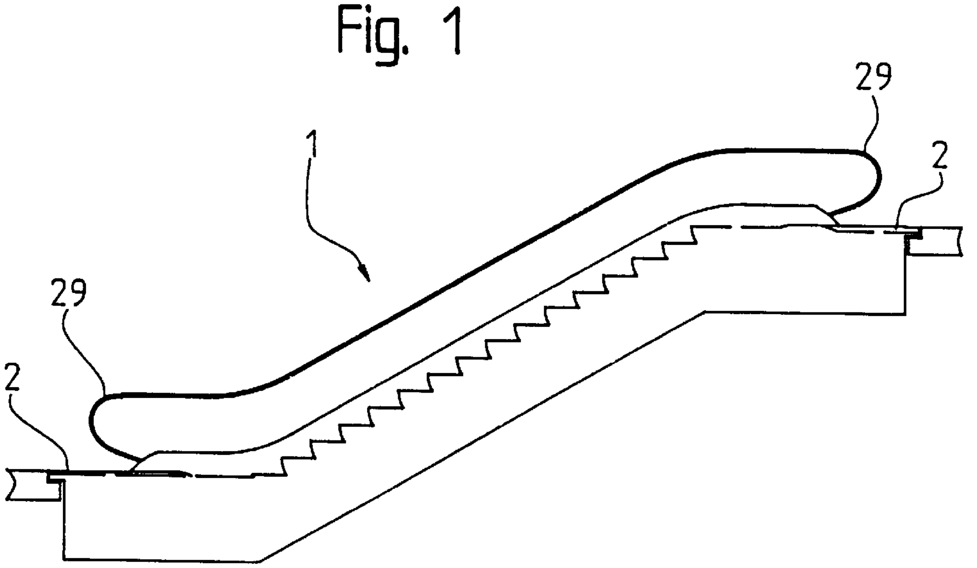
FIG. 1 depicts a typical person conveying equipment, in the form of an escalator.

A conveying equipment 1 for persons is illustrated in FIG. 1 in the form of, by way of example, an escalator, which has at each of its upper and lower ends a platform with a respective floor cover 2. The balustrade end curves are designated by 29; each project partly over the floor cover 2.

Figure 2:
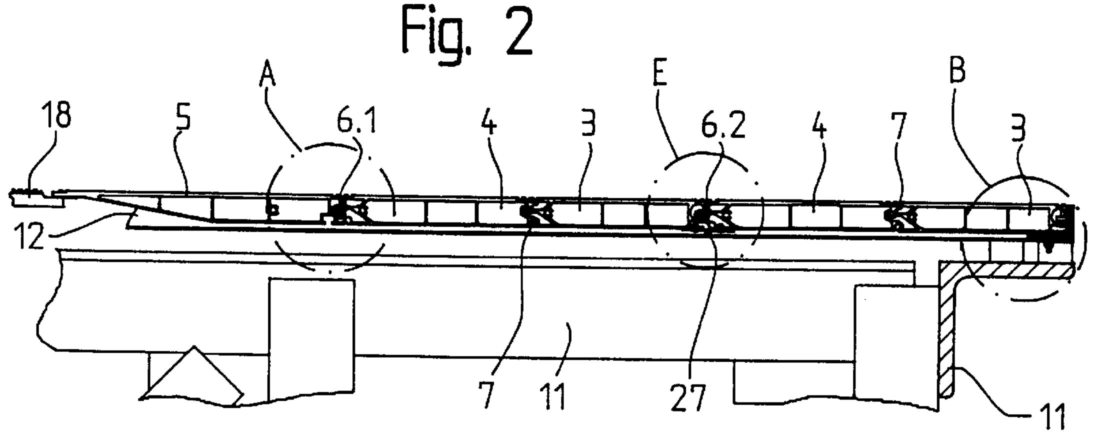
FIG. 2 is a cross-section view through the floor cover of the present invention.

The individual elements of the floor cover 2 are shown in cross-section in FIG. 2, and include, at the left end, a connecting element 5, which may be constructed as a hollow profile member with transverse webs and with its tapering left-hand side resting on a comb plate 18 of a safety device and ending at the right at a cover separating location 6.1. The encircled separating location 6.1 is denoted by A and is illustrated enlarged and with further details in FIG. 3. With reference to the separating location 6.1, the right-hand adjoining cover part comprises one or more cover elements 4 and/or 3, which are each formed as rectangular hollow profile members and which are non-separably connected together by press joints 7 at the longitudinal side edges of the profile members. So joined together, and as shown in FIG. 2, the adjoining elements 4 and 3 form a unitary cover portion.

Figure 3:
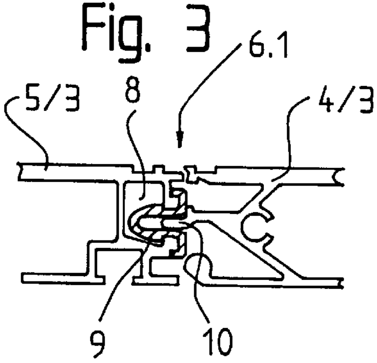
FIG. 3 is an enlarged cross-section view of location A in FIG. 2, detailing a separating location between cover elements.
Figure 4:
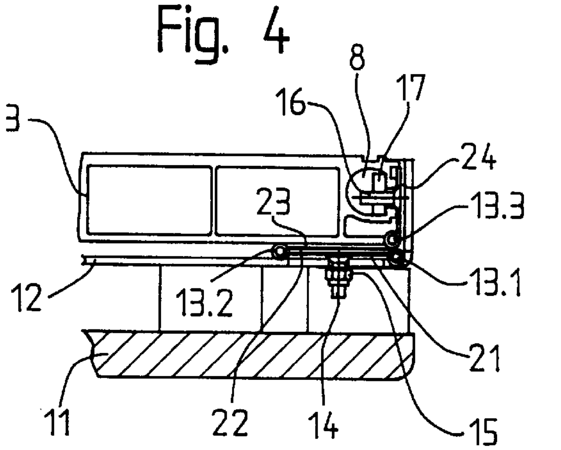
FIG. 4 is an enlarged cross-section of location B in FIG. 2, detailing the folding device of the invention.

As seen in FIGS. 2 and 3, the left-hand longitudinal side of a first cover element 4 forms the right-hand part at separating location 6.1, while the right-hand longitudinal side of cover element 3 forms the left-hand part at a second separating location 6.2. The next-following cover elements 3 and 4, similarly joined together by a press joint 7, are constructed in analogous manner, wherein the left-hand longitudinal side of the cover element 4 forms the right-hand side at the second separating location 6.2 and the right-hand longitudinal side of the adjoining cover element 3 forms the right-hand end of the floor cover 2 in encircled region B, which is illustrated enlarged and with further details in FIG. 4. An angle frame, which closes off and supports the floor cover 2 along its two longitudinal sides and a transverse side, is designated by 12. Parts of the support construction of the conveying equipment 1 for persons are designated by 11. A mechanical connection, not detailed, joins the angle frame 12 to the support construction 11.

FIG. 3 details region A of the separating location 6.1 and illustrates the constructions of the right-hand longitudinal side of the connecting element 5 (or cover element 3 at location 6.2) and the left-hand longitudinal side of the first cover element 4. The right-hand longitudinal side of connecting element 5 (or cover element 3) has a hollow groove 8 with an opening to the right, into which a resilient profile member 9 is pressed, and which notches into the hollow groove 8 through the groove opening bounded by small, externally protruding projections and externally surrounding small end faces at both sides of the opening. The resilient profile member 9 has approximately the shape of a Greek capital letter omega. Cover element 4 (or) has at its left-hand longitudinal side a nose 10, which fits into the opening of the resilient profile member 9, as well as an adjacent abutment surface which extends upwardly right-angled relative to the nose 10 and which butts against the upper lateral limb of the resilient profile member 9 and thus prevents any mutual metallic contact of elements 5 and 4 during walking on the floor cover. The creation of noise during walking on the floor cover 8 is thereby largely suppressed.

Access can be obtained to the covered operating equipment by means of a device for raising and turning up the cover elements 3, 4. This can be effected by means of a recessed grip, (not illustrated) or an insertable grip in one cover element (also not shown). The details of the pivot region B allowing the raising are shown in the enlarged illustration of FIG. 4. A multi-part hinge 13 comprises three rotational axles 13.1, 13.2 and 13.3 and four interconnected hinge strips 21, 22, 23 and 24. The first, lower hinge strip 21 is fastened, such as by screws 14 and nuts 15, to the angle frame 12 and has the first rotational axle 13.1. The second hinge strip 22 is arranged between the first rotational axle 13.1 and the second rotational axle 13.2 to be freely movable, while the third hinge strip 23 is arranged between the rotational axles 13.2 and 13.3 to be freely movable. The fourth hinge strip 24, with the rotational axle 13.3, is fastened to the longitudinal side of the cover element 3 by means of screw 8 and groove nut 17.

Figure 11:
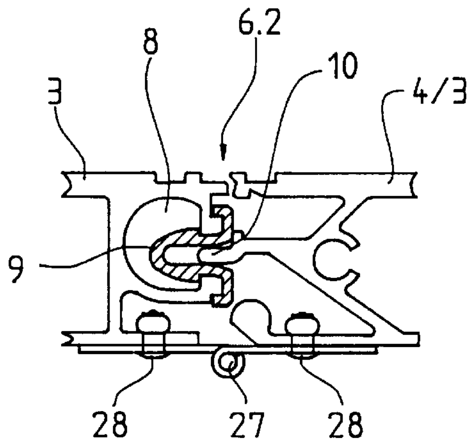
FIG. 11 is an enlarged cross-section view of a second separating location having a bar hinge.

A separating location, for example the second separating location 6.2, can additionally be provided with a hinge 27. This is illustrated enlarged in FIG. 11. At the joint location 6.2 hinge 27, which preferably extends over the entire cover width and is constructed as a so-called bar hinge, is fastened to the underside of the cover elements 3 and 4 by means of, for example, blind rivets 28, self-tapping screws or the like.

The function and manipulation of the cover according to the invention is explained as follows with reference to FIGS. 5 to 10. In these figures an intermediate cover element 19 is additionally shown, which has longitudinal sides adapted for joining by pressing with cover elements 3, 4, whereby the adjoining elements 4, 19 and 3 form a rigid assembly.

Figure 5:
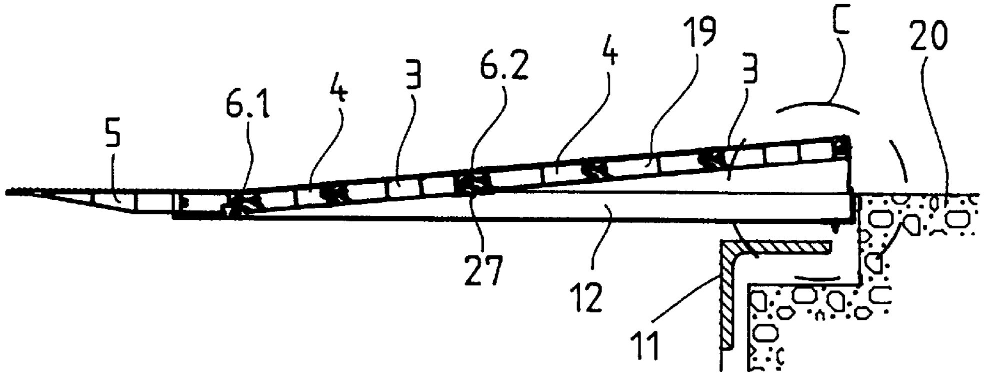
FIG. 5 is the floor cover during a lift out.
Figure 6:
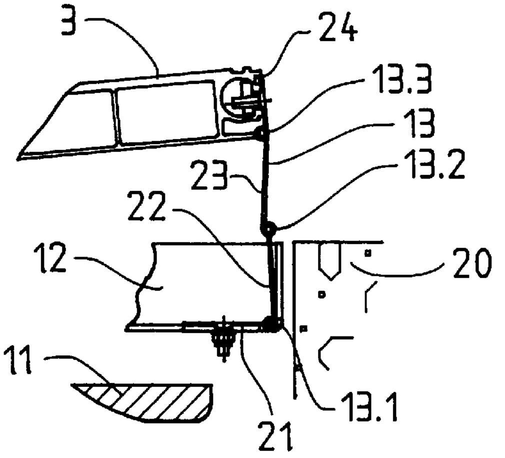
FIG. 6 details the multi-part hinge during lifting of the cover.

FIGS. 5 and 6: Floor cover 2 is raised aloft by means of the afore-mentioned grip. Hinge 13 is unfolded upwardly, wherein the rotational axle 13.2 is then disposed directly above the story floor 20. The left-hand separating location 6.1 is somewhat loosened, the nose 10 of cover element 4 being retracted from the opening of the omega-adapted resilient profile member 9 mounted in connecting element 5. The connecting element 5 remains in the angle frame 12. After removal of the remaining cover elements 3, 4 and 19, the opening to the right of connecting element 5 is large enough for an unobstructed access to the operating equipment.

Figure 7:
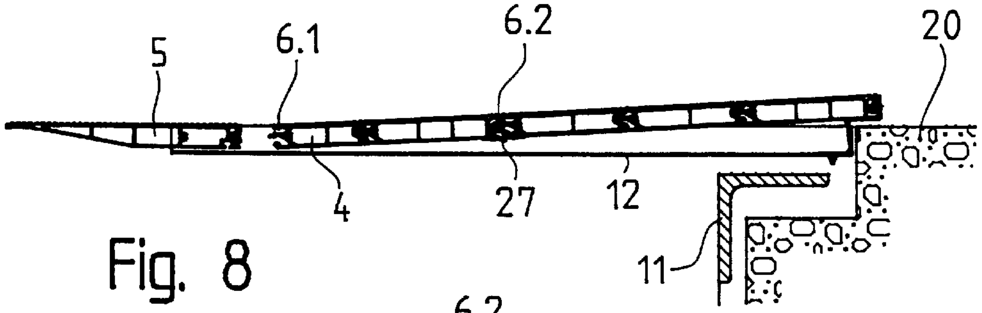
FIG. 7 depicts the floor cover during the initial separation of the connecting elements.

FIG. 7: By drawing the cover elements 3, 4 and 19 to the right and laying the hinge strip 23 on the story floor 20 together with the connected portion of cover element 3, the leftmost cover element 4 is fully released from the connecting element 5 at separating location 6.1.

Figure 8:
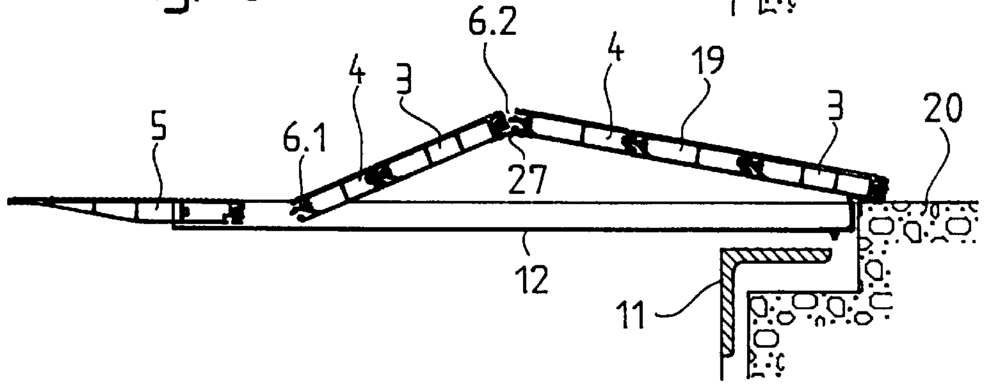
FIG. 8 depicts the floor cover during the further separation of the elements.

FIG. 8: By raising the joined-together cover elements 4, 19, 3, the separating location 6.2 also opens and the pass cover elements 3 and 4 pivotably, connected by the hinge 27 to the second cover element 4, slide along the angle frame 12, and away from the region of the balustrade curve 29 (FIG. 1). The hinged elements are supported along the angle frame 12 as they slide by the left edge portion of the element 4 of separation location 6.1. The complete floor cover 2 can then be pivoted around the hinge 13 and laid flat on the story floor 20.

Figure 9:
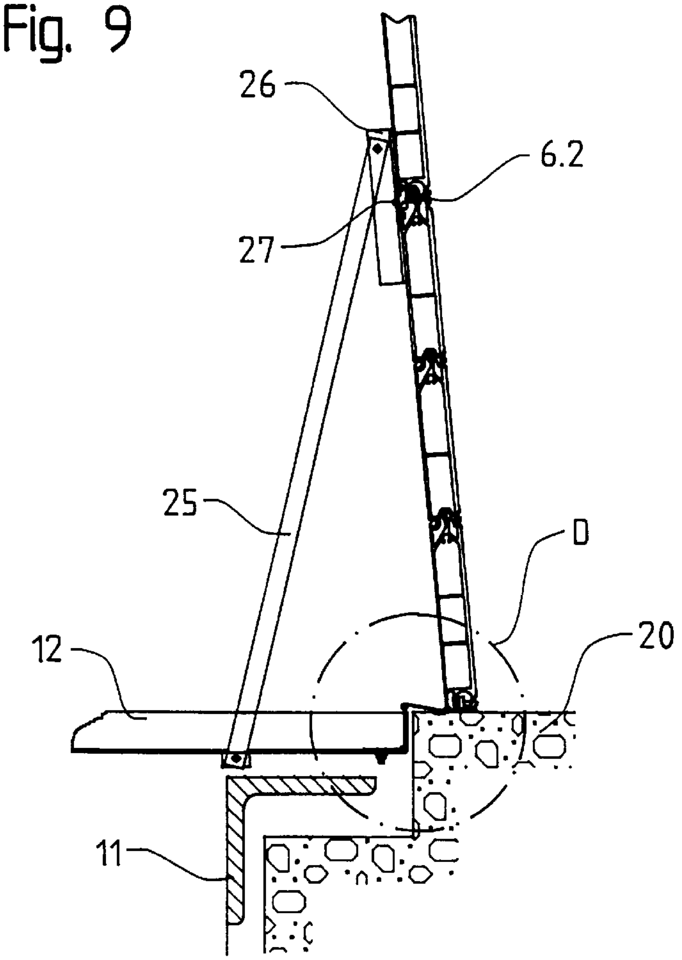
FIG. 9 depicts the floor cover in the raised or turned-up state.
Figure 10:
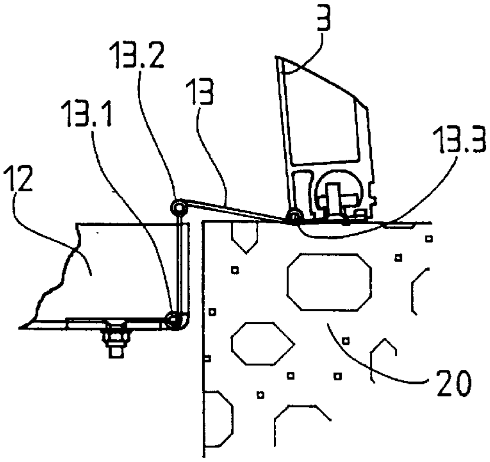
FIG. 10 depicts the multi-part hinge in the raised or turned-up state.

FIGS. 9 and 10: It is shown by reference to these illustrations that the floor cover 2 may be held in a vertical position in the open state by means of a support device, the raised cover further serving as a barrier for the exposed opening. In the raised position tripping over laid-down cover elements of the floor cover 2 on the story floor 20 is avoided. The support device consists of at least one strut 25 pivotably fastened to the angle frame 12 and at least one connecting profile member 26 which is fastened to the underside to the cover elements 3 and 4 the profile member 26 bridges over and locks the second separating location 6.2 in the closed position and provides the means by which the strut 25 can be suspended and fastened to the cover elements.

If desired, the cavities of the hollow profile members of the cover elements 3, 4, 5 and 19 can be foam-filled to further inhibit footstep noises. Appropriately constructed sandwich-construction plates with a hard-wearing step surface can also be used for the cover elements according to the invention instead of metal hollow profile members. A skid-resisting plastic or metal covering can be provided as the hard-wearing step surface.

We claim:

1. A floor cover assembly for conveying equipment for flushly closing off an opening of an under-floor space and for providing access to the opening, comprising: a liftable cover; a fixed connecting element releasably connected to the cover at a joint; means for allowing the cover to be raised and pivoted about at least a first longitudinal side of the cover from an initial opening-covering position to afford access to the opening; and a sound-insulating and sealing intermediate member between the connecting element and the cover at the joint, the sound-insulating and sealing intermediate member constructed as a resilient profile member in the shape of a Greek letter Omega having a projecting enlarged head portion, one of the cover and the connecting element having a longitudinal side with a profile member-accepting detent in the form of a groove having a pair of opposed end faces forming a reduced width groove opening therebetween, the head portion of the profile member being inserted into the groove through the groove opening and being maintained within the groove.

2. The floor cover assembly according to claim 1, characterized in that the means for allowing the cover to be raised and pivoted comprises a multi-part hinge with first, second and third rotational axles and with first, second, third and fourth hinge strips.

3. The floor covering assembly according to claim 1, characterized in that the longitudinal side of the first cover element has a nose fitting into an opening of the resilient profile member.

4. The floor cover assembly according to claim 1, 2 or 3, wherein the liftable cover further comprises a second cover element, pivotally joined to said first cover element along a joint between abutting longitudinal sides of the first and second cover elements.

5. The floor cover assembly according to claim 4 wherein a second sound-insulating intermediate layer is arranged at the joint between the first and second cover elements.

6. The floor cover assembly according to claim 5, characterized in that the second sound insulating intermediate layer between the first and second cover elements is constructed as a resilient profile member in the shape of a Greek letter Omega and is detented in a longitudinal side of one of the first and second cover elements.

7. The floor cover according to claim 6, characterized in that the longitudinal side of the one of the first and second cover elements bearing the resilient profile member has a rounded-off hollow groove with a lateral opening and that the longitudinal side of the other of the first and second cover elements has a nose fitting in an opening of the resilient profile member.

8. The floor cover according to claim 4, further comprising a support device in the form of a strut and a connecting profile member bridging the joint between the first and second cover elements.

9. The floor cover according to claim 4 wherein at least one of the cover elements is formed of two sub-elements joined by a non-separable press joint.

10. The floor cover according to claim 4 characterized in that the joint between the first and second cover elements is provided with a hinge.

11. A floor cover assembly for conveying equipment for flushly closing off an opening of an under-floor space and for providing access to the opening, comprising: a liftable cover having first and second cover elements pivotally joined together along a joint between abutting longitudinal sides; a fixed connecting element releasably connected to the first cover element at a first joint at a first longitudinal side of the first cover element; means for allowing the cover to be raised and pivoted about at least a longitudinal side of the second cover element from an initial opening-covering position to afford access to the opening; a first sound-insulating and sealing intermediate member between the connecting element and the first cover element and a second sound-insulating and sealing intermediate member between the first and second cover elements; the first and second sound-insulating and sealing intermediate members constructed as a resilient profile member in the shape of a Greek letter Omega having a head portion, the first sound-insulating and sealing intermediate member affixed to the cover, the head portion being detented in a longitudinal side of the fixed connecting element, the second sound-insulating and sealing intermediate member affixed to one of the first and second cover elements, the head portion thereof being detented in a longitudinal side of the other of the first and second cover elements.

12. The floor cover assembly according to claim 11, characterized in that the means for allowing the first cover element to be raised and pivoted comprises a multi-part hinge with first, second and third rotational axles and with first, second, third and fourth hinge strips.

13. The floor cover assembly according to claim 11, characterized in that a longitudinal side of the fixed connecting element has a rounded-off hollow groove with a lateral opening and that the longitudinal side of the first cover element has a nose fitting in an opening of the resilient profile member.

14. The floor cover assembly according to claim 11, characterized in that the longitudinal side of the one of the first and second cover elements bearing the resilient profile member has a rounded-off hollow groove with a lateral opening and that the longitudinal side of the other of the first and second cover elements has a nose fitting in an opening of the resilient profile member.

15. A floor cover assembly according to claim 11, further comprising a support device in the form of a strut and a connecting profile member bridging the joint between the first and second cover elements.

16. The floor cover assembly according to claim 11 wherein at least one of the floor elements is formed of two sub-elements joined by a non-separable press joint.

17. The floor cover assembly according to claim 11 characterized in that the joint between the first and second floor elements is provided with a hinge.

* * * * *